(No Model.)

2 Sheets—Sheet 1.

J. R. BANE.
HORSE HAY RAKE.

No. 284,996. Patented Sept. 18, 1883.

Witnesses,
Wm. A. Bell
Edwd S. Harrison

Inventor
James R. Bane (No Model.) 2 Sheets—Sheet 2.
J. R. BANE.
HORSE HAY RAKE.
No. 284,996. Patented Sept. 18, 1883.
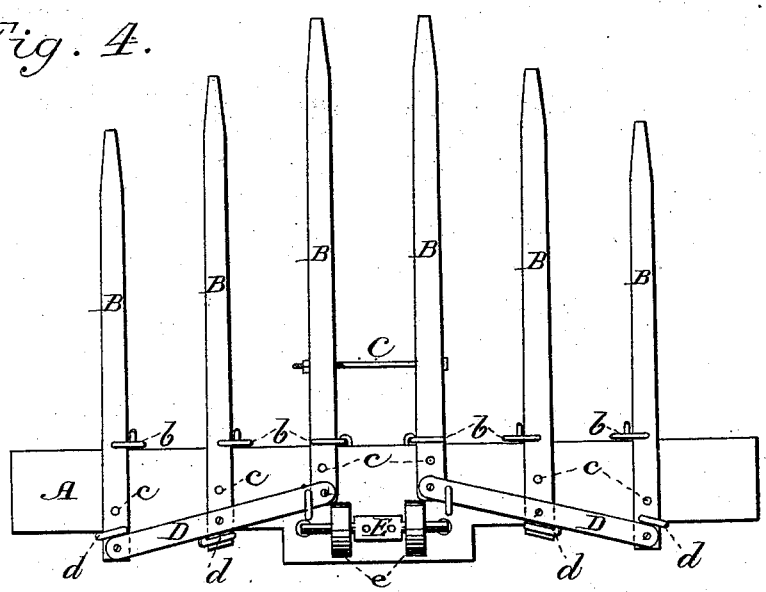
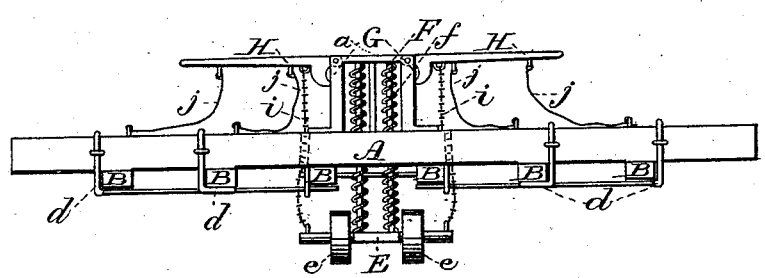
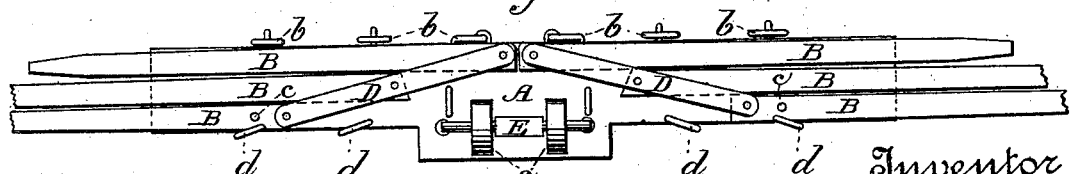
Witnesses:
Wm. B. Bell
Edwd S. Harrison
Inventor
James R. Bane

UNITED STATES PATENT OFFICE.

JAMES R. BANE, OF GILROY, CALIFORNIA.

HORSE HAY-RAKE.

SPECIFICATION forming part of Letters Patent No. 284,996, dated September 18, 1883.

Application filed April 30, 1883. (No model.)

*To all whom it may concern:*

Be it known that I, JAMES R. BANE, of Gilroy, county of Santa Clara, State of California, have invented new and useful Improvements in Horse Hay-Rakes used for Bunching Hay; and I hereby declare the following to be a full, clear, and exact description thereof.

These improvements consist in means whereby the rake unloads itself, and carries the driver, if desired, and can be neatly folded up for convenience in handling. The main weight is carried on wheels, thus saving the wear on the rake and the strength of man and beast.

The object of my invention is to have a simple, durable, and easily-handled machine.

Figure 1:
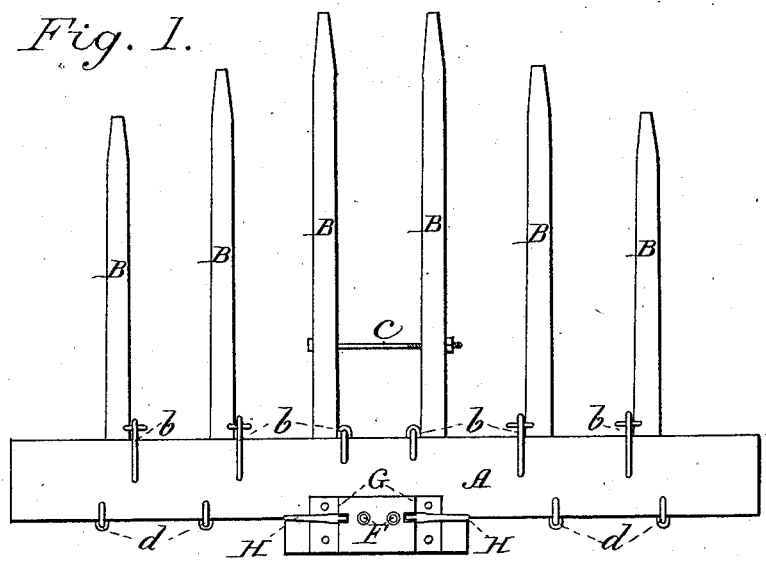
Figure 2:
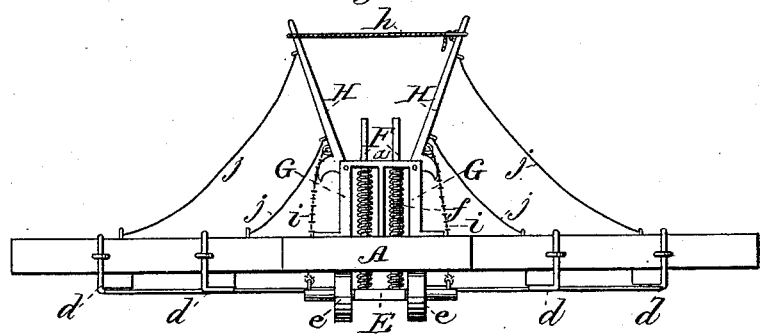
Figure 3:
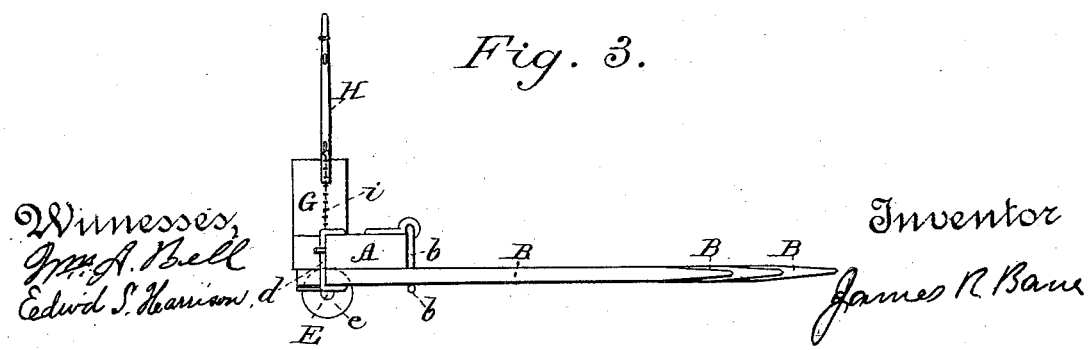

Referring to the accompanying drawings, Figure 1 is a plan view of my rake ready for operation. Fig. 2 is a rear view of the same, showing the rake ready to operate. Fig. 3 is a side or end view of the same. Fig. 4 is a view of the under side of the rake, showing the rollers which support it, and the braces and hinged clasps which secure the teeth to the main beam when not folded. Fig. 5 is a rear view of the rake as it appears just after it has discharged its load. Fig. 6 is a view of the rake, showing the under side when folded up ready for transportation.

Let A represent the main beam, to which the other parts are attached.

B represents the teeth used for gathering the hay.

C represents a rod used for holding the teeth B in working position, which, when removed, allows one triplet of teeth to be folded to the right and the other triplet to the left.

D represents braces under the rear end of teeth B, designed to aid the person handling the rake in folding all the teeth in each triplet by taking hold of only one tooth, and to strengthen them, more especially in folding and unfolding.

*b* and *d* represent clasps, some of them hinged and some stiff, used for securing the teeth B to the main beam A when not folded. The front clasps on the center and outer teeth in Figs. 1 and 4 are hinged. They are thus arranged that they will move upward and out of the way when the teeth come against them in folding.

*c* represents bolts which pass through the teeth B and main beam A, upon which the teeth pivot. They are never disturbed.

E represents the axle, on whose ends are the wheels *e*. *e* represents wheels which carry the load, and prevent the rake from rubbing and wearing out on the ground. Thus by rolling instead of dragging, the draft on the team is much less and the driver may ride.

F represents rods extending up from the axle E (in which they are fastened) through the springs *f* and into the plate *a*, thereby keeping said springs in proper position. *f* represents two spiral springs used for upsetting the rake when loaded.

*a* represents a plate connecting the shoulders or stools G, and containing eyes through which pass the rods F. The upper ends of the springs *f* press against it.

G represents shoulders or stools secured at their base to the main beam A by means of bolts, and extending upward at a right angle from main beam A to a point where they meet the levers H and the plate *a*, which connects them.

H represents levers which are socketed into the tops of the shoulders G in such a manner as to be easily raised or lowered. When the driver wishes to gather hay, he elevates these levers until they are vertical and parallel to each other, or nearly so. He then secures them by means of a rope or chain, *h*.

*i* represents chains connecting the levers H and the axle E. By means of these chains *i* the levers H draw the axle E and the wheels *e* up close under the rake. Thus are the springs *f* compressed. Now the driver starts. When a sufficient quantity of hay is gathered, the driver disengages the rope *h* and one of the levers H, whereupon the compressed springs *f* expand, driving the axle E and wheels *e* downward and elevating the plate *a*, attached to the shoulders G, which, being firmly attached to the main beam A, elevate the rear part of the whole rake. This elevation of the rear causes the front end of the teeth B to come in contact with the ground. This will start the revolutions of the rake. When half-way over, the bracket G G *a* will catch the ground. As the team is in motion, of course the rake makes a complete somersault.

*j* represents ropes or chains extending from levers H to main beam A, to prevent hay the from dropping over and behind the rake when in motion.

Having thus described my invention, what I claim as new, and desire to secure by Letters Patent, is—

1. The combination of the rake-frame A, pivoted teeth B, pivoted braces D, the clasps $d$, and hinged clasps $b$, whereby the rake-teeth may be compactly folded under the main frame.

2. The combination of the rake-frame A, pivoted teeth B, pivoted braces D, the clasps $d$, the hinged clasps $b$, and rod $c$, whereby the rake-teeth are securely held in their working position.

3. The combination of the rake, substantially as described, the truck, the spiral springs, and suitable connecting mechanisms, whereby the position of the rake with reference to the truck and the inclination of the teeth to the ground may be adjusted for the purpose of adapting the rake to accumulate and to dump its load.

4. The combination of the rake, substantially as described, the brackets G G $a$, truck E $e$ $e$, posts F F, springs $f$ $f$, chains $i$ $i$ $j$ $j$, chain $h$, and levers H H, whereby the position of the rake with reference to the truck and the inclination of the teeth to the ground may be adjusted for the purpose of adapting the rake to accumulate and to dump its load.

In witness whereof I have hereunto set my hand.

JAMES R. BANE.

Witnesses:
  WM. H. BELL,
  E. S. HARRISON.